(12) United States Patent
Ke et al.

(10) Patent No.: US 12,716,451 B2
(45) Date of Patent: Aug. 25, 2026

(54) HYDROSTATIC GAS BEARING WITH HUMIDITY REMOVED BY ELECTRICAL HEATING

(71) Applicant: Wuhan Second Ship Design and Research Institute, Wuhan (CN)

(72) Inventors: Zhiwu Ke, Wuhan (CN); Zhenxing Zhao, Wuhan (CN); Hanbing Ke, Wuhan (CN); Can Ma, Wuhan (CN); Xingsheng Lao, Wuhan (CN); Tao He, Wuhan (CN); Lu Dai, Wuhan (CN); Yong Liu, Wuhan (CN); Xiaohu Yang, Wuhan (CN); Guangzhan Xu, Wuhan (CN); Ping Song, Wuhan (CN)

(73) Assignee: Wuhan Second Ship Design and Research Institute, Wuhan (CN)

( * ) Notice: Subject to any disclaimer, the term of this patent is extended or adjusted under 35 U.S.C. 154(b) by 173 days.

(21) Appl. No.: 18/891,382

(22) Filed: Sep. 20, 2024

(65) Prior Publication Data

US 2025/0198460 A1 Jun. 19, 2025

(30) Foreign Application Priority Data

Dec. 14, 2023 (CN) ......................... 202311725132.6

(51) Int. Cl.
*F16C 32/00* (2006.01)
*F16C 32/06* (2006.01)

(52) U.S. Cl.
CPC ...... *F16C 32/0618* (2013.01); *F16C 32/0662* (2013.01)

(58) Field of Classification Search
CPC .............. F16C 32/0618; F16C 32/0662; F16C 32/0603; H02K 7/08; H02K 7/1884; H02K 7/1876; F02B 71/04

(Continued)

(56) References Cited

U.S. PATENT DOCUMENTS 2,377,770 A * 6/1945 Fish .......................... F16J 15/54 277/423
2,936,715 A * 5/1960 Southam ............... F04D 29/146 277/377

(Continued)

FOREIGN PATENT DOCUMENTS

CN 105065453 A 11/2015
CN 105805160 A 7/2016

(Continued)

OTHER PUBLICATIONS

Chinese Office Action for Application No. 2023117251326, dated Jun. 13, 2024, with English translation, 9 pgs.

(Continued)

*Primary Examiner* — Maged M Almawri
(74) *Attorney, Agent, or Firm* — Young Basile Hanlon & MacFarlane, P.C.

(57) ABSTRACT

A hydrostatic gas bearing with humidity removed by electrical heating. The hydrostatic gas bearing includes a bearing seat, a rotary shaft, an annular throttling component, and a plurality of heating rods. A cavity is provided inside the bearing seat and an inlet pipe is provided on an outer surface of the bearing seat that communicates with the cavity. The annular throttling component is sleeved on the outside of the rotary shaft, with a first gap provided between the annular throttling component and the rotary shaft. The annular throttling component is configured to throttle and cool a medium. A plurality of heating rods are provided in the annular throttling component, arranged circularly along a circumference of the annular throttling component, and configured to heat and vaporize a part in liquid phase in a cooled medium.

10 Claims, 2 Drawing Sheets

(58) Field of Classification Search
USPC ......................... 310/90, 15–25, 12.01–12.31
See application file for complete search history.

(56) References Cited

U.S. PATENT DOCUMENTS 2,971,783 A * 2/1961 Laser ..................... F16J 15/441 277/408
3,330,567 A * 7/1967 Mercer ................. B21B 31/078 277/423
3,494,681 A * 2/1970 Anderson ............. F16C 23/084 277/423
3,510,138 A * 5/1970 Bowen ................. F16J 15/3264 384/135
3,832,021 A * 8/1974 Jennings ............... B21B 31/078 277/420
3,887,199 A * 6/1975 Sundqvist ................ F16J 15/32 277/589
4,380,416 A * 4/1983 Menager ............... F04D 29/126 415/174.3
4,579,349 A * 4/1986 Pipich .................... F16J 15/441 277/927
4,832,511 A * 5/1989 Nisley ................. F16C 33/7806 384/480
5,028,054 A * 7/1991 Peach .................. F16J 15/3264 384/480
5,996,542 A * 12/1999 Bathurst .............. F16J 15/4476 277/351
6,250,808 B1 * 6/2001 Ichiyama .............. F16C 33/107 310/90
6,376,949 B1 * 4/2002 Hayslett ................... H02K 5/10 277/408
6,471,215 B1 * 10/2002 Drago .................... F16J 15/166 277/420
6,746,018 B2 * 6/2004 Lewis .................. F16J 15/3264 277/351
8,328,202 B2 * 12/2012 Foster .................. F16J 15/3236 277/572
10,125,872 B2 * 11/2018 Binder ................... F16J 15/322
10,396,618 B2 * 8/2019 Kawashima ........... H02K 5/124
10,569,962 B2 * 2/2020 Grimm ............... F16C 33/7896
11,746,906 B1 * 9/2023 Balta .................... F16J 15/3204 277/309
2003/0155718 A1 * 8/2003 Lewis .................. F16J 15/3264 277/549
2006/0170297 A1 * 8/2006 Jyono ................... F16C 33/107 310/90
2013/0300230 A1 * 11/2013 Nakazawa ............... H02K 9/04 310/63
2016/0003361 A1 * 1/2016 Takahashi ............ F16J 15/3448 277/377
2016/0146248 A1 * 5/2016 Ertas ................... F16C 33/1005 384/105
2017/0058951 A1 * 3/2017 Rodriguez Erdmenger ................ F16C 32/0622
2021/0301871 A1 * 9/2021 Fesperman, Jr. ... F16C 32/0648
2022/0325749 A1 * 10/2022 Jin ........................ F16C 27/045

FOREIGN PATENT DOCUMENTS

CN 107061496 A 8/2017
CN 115306760 A 11/2022
JP H05168840 A 7/1993
JP 2007333153 A 12/2007

OTHER PUBLICATIONS

Chinese Notification of Decision to Grant Patent Right for Invention for Application No. 2023117251326, dated Aug. 27, 2024, with English translation, 5 pgs.

* cited by examiner

HYDROSTATIC GAS BEARING WITH HUMIDITY REMOVED BY ELECTRICAL HEATING

CROSS-REFERENCE TO RELATED DISCLOSURES

This disclosure claims priority to Chinese Patent Application No. 2023117251326, filed on Dec. 14, 2023, entitled "Hydrostatic Gas Bearing with Humidity Removed by Electrical Heating", which is hereby incorporated by reference in its entirety.

TECHNICAL FIELD

The present disclosure relates to the field of bearing, specifically to a hydrostatic gas bearing with humidity removed by electrical heating.

BACKGROUND

Bearings are one of the key components of power machinery. Hydrostatic gas bearings have a strong capacity in bearing loads and may use high-pressure gas internally from a power system as the working medium of bearing. The working medium is more compatible with the system, and compared to traditional oil-lubricated bearings, the need for an oil supply system may be eliminated, losses due to friction in bearing may be reduced, and the power system may be simplified with energy efficiency improved. In some power systems, such as a steam system of nuclear power plants, steam may liquefy to form water droplets during throttling expansion. When such working media are used as the gas supply for hydrostatic gas bearings, gas pressure and temperature decrease during throttling in the hydrostatic gas bearing and thus the gas may be liquefied, so that a two-phase mixture of gas and liquid may enter bearing clearance, and it is difficult for the bearing to operate reliably.

BRIEF SUMMARY

The present disclosure provides a hydrostatic gas bearing with humidity removed by electrical heating to address problems in the prior art where two-phase mixtures of gas and liquid liquefy to form water droplets during throttling expansion, so that it is difficult for the bearing to operate reliably.

The present disclosure provides a hydrostatic gas bearing with humidity removed by electrical heating, including: a bearing seat, a cavity is provided inside the bearing seat and an inlet pipe is provided on an outer surface of the bearing seat and communicates with the cavity; a rotary shaft, passing through the bearing seat; an annular throttling component, sleeved on the outside of the rotary shaft and provided inside the cavity, with a first gap provided between the annular throttling component and the rotary shaft, the first gap passing through the bearing seat to form an exhaust channel. The annular throttling component is configured to throttle and cool a medium. A plurality of heating rods, provided in the annular throttling component, arranged circularly along circumference of the annular throttling component, and configured to heat and vaporize a part in liquid phase in a cooled medium.

According to the hydrostatic gas bearing with humidity removed by electrical heating provided in this disclosure, the annular throttling component is made of a material with a porous structure.

In the hydrostatic gas bearing with humidity removed by electrical heating provided in this disclosure, the annular throttling component is made of a material with a porous structure.

In the hydrostatic gas bearing with humidity removed by electrical heating provided in this disclosure, the annular throttling component is provided with a plurality of first via holes on walls, the plurality of first via holes are configured to perform throttling and cooling on the medium.

In the hydrostatic gas bearing with humidity removed by electrical heating provided in this disclosure, the annular throttling component is a non-metallic annular throttling component.

In the hydrostatic gas bearing with humidity removed by electrical heating provided in this disclosure, a plurality of heating rods are arranged circularly along circumference of the annular throttling component, to form heating layers. The heating layers are multiple layers, with a gap between adjacent layers.

The hydrostatic gas bearing with humidity removed by electrical heating provided in this disclosure, further includes a first adjustable resistor, which is electrically connected to a plurality of heating rods and is configured to adjust a power of the heating rod.

The hydrostatic gas bearing with humidity removed by electrical heating provided in this disclosure, further includes: a second adjustable resistor, electrically connected to the heating layer adjacent to the first gap; a third adjustable resistor, electrically connected to the remaining heating layers.

In the hydrostatic gas bearing with humidity removed by electrical heating provided in this disclosure, both ends of each heating rods of a plurality of heating rods are connected to the first adjustable resistor via wires respectively.

In the hydrostatic gas bearing with humidity removed by electrical heating provided in this disclosure, a second gap is formed between the annular throttling component and an inner wall of the bearing seat, to form an inlet channel which communicates with the inlet pipe.

In the hydrostatic gas bearing with humidity removed by electrical heating provided in this disclosure, the bearing seat includes an annular member and a pair of end caps. The pair of end caps are respectively provided at both ends of the annular member. Each of the end caps is provided with a second via hole, through which the rotary shaft is disposed. A diameter of the second via hole is larger than a diameter of the rotary shaft, so that the exhaust channel is provided therein.

The hydrostatic gas bearing with humidity removed by electrical heating provided in this disclosure may decrease the temperature and pressure of the medium utilizing a throttling effect with the annular throttling component and the plurality of heating rods, and vaporize a part in liquid phase in the working medium to be in gas phase by the heating rods, so that liquid can be prevented from entering the first gap during operation of a hydrostatic gas bearing, which would otherwise lead to unstable operation of the hydrostatic gas bearing, and the operation reliability of the hydrostatic gas bearing may be improved.

BRIEF DESCRIPTION OF THE DRAWINGS

For better clarification of the technical solutions in the embodiments or the prior art, brief introduction is made below on the drawings used in explaining the embodiments or the prior art. It is obvious that the drawings in the following description are only some embodiments of the present disclosure. For one skilled in the art, other drawings are obtainable based on these drawings without inventive effort.

REFERENCE NUMERALS

10: bearing seat; 11: annular member; 12: end cap; 20: rotary shaft; 30: annular throttling component; 40: heating rod; 50: first adjustable resistor; 60: power supply; 70: inlet pipe; 80: wire; 101: first gap; 102: second gap.

DETAILED DESCRIPTION

To better clarify objectives, technical solutions, and advantages of the present disclosure, technical solutions in the present disclosure will be clearly and thoroughly described below in conjunction with the drawings. It is obvious that the described embodiments are some of the embodiments of the present disclosure, but not all of them. Based on the embodiments of the present disclosure, all other embodiments obtained by skilled in the art without creative efforts shall fall within the scope of the present disclosure.

The terms "first" and "second" in the specification and claims of the present disclosure may explicitly or implicitly include one or more of such features. In the description of the present disclosure, unless otherwise specified, the term "a plurality of" or "a plurality of" means two or more.

The hydrostatic gas bearing with humidity removed by electrical heating of the present disclosure is described below in conjunction with FIGS. 1 and 2.

Figure 1:
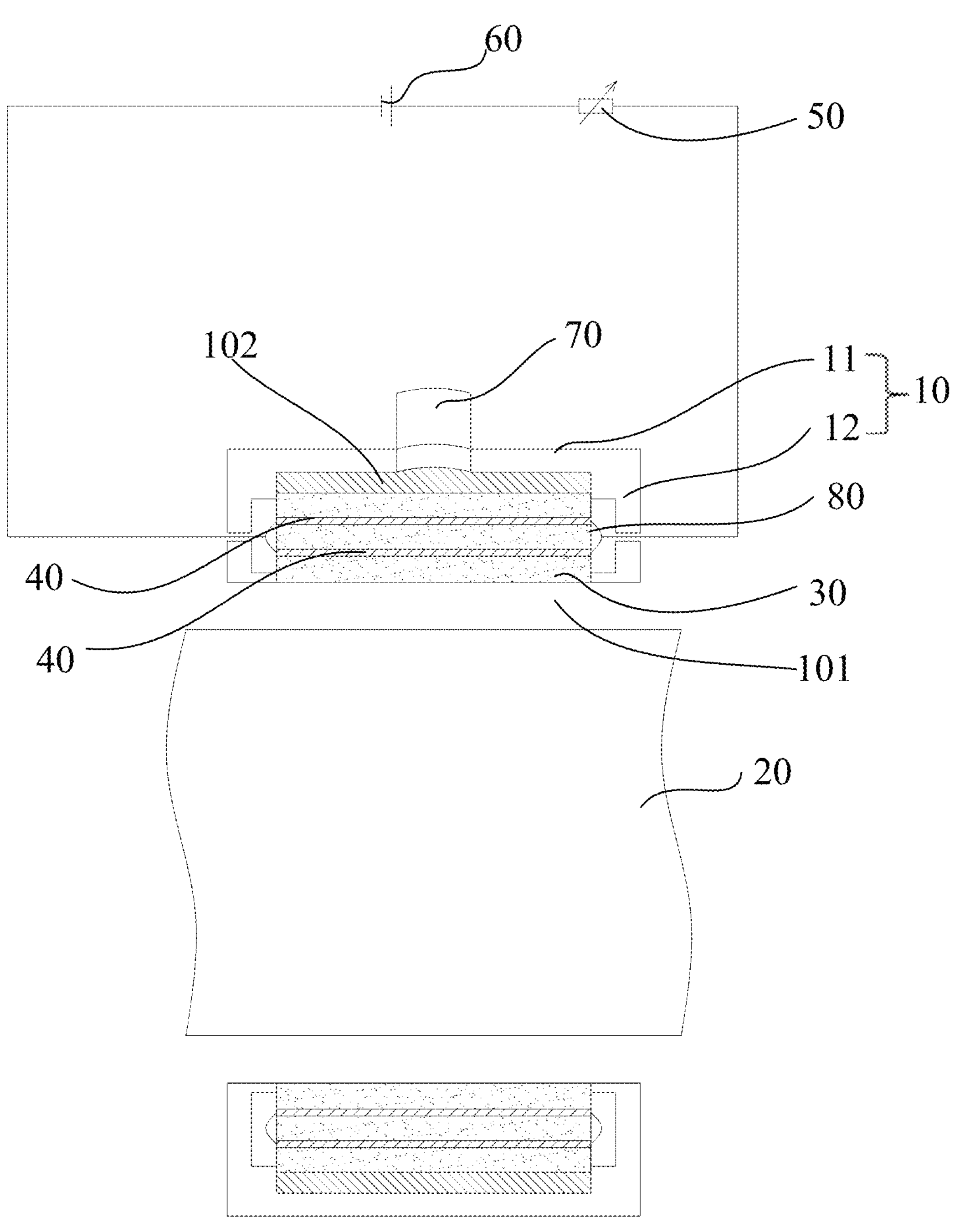
FIG. 1 is a schematic structural diagram of the hydrostatic gas bearing with humidity removed by electrical heating provided by the present disclosure.

As shown in FIG. 1, an embodiment of the present disclosure provides a hydrostatic gas bearing with humidity removed by electrical heating, including: a bearing seat 10, a rotary shaft 20, an annular throttling component 30, and a plurality of heating rods. A cavity is provided inside the bearing seat 10 and an inlet pipe 70 is provided on an outer surface of the bearing seat 10 and communicates with the cavity. The rotary shaft 20 passes through the bearing seat 10. The annular throttling component 30 is sleeved on the outside of the rotary shaft 20 and provided inside the cavity. A first gap 10 is provided between the annular throttling component and the annular throttling component 30. The first gap 101 passes through the bearing seat 10 to form an exhaust channel. The annular throttling component 30 is configured to throttle and cool the working medium. The plurality of heating rods are provided inside of the annular throttling component 30 and arranged circularly along circumference of the annular throttling component 30. The heating rods are configured to heat and vaporize a part in liquid phase in a cooled medium.

Specifically, in the embodiments of the present disclosure, the inlet pipe 70 may be in plural. The plurality of inlet pipes 70 may be arranged circularly along circumference of the bearing seat 10. The inlet pipe 70 may be configured to transport the working medium into the cavity of the bearing seat 10. In this embodiment, the working medium is a gas-phase working medium that is easily liquefied or a working medium in two phases of liquid and gas. When the working medium passes by the annular throttling component 30, a throttling effect is generated so that the pressure and temperature of the working medium may be decreased, and the part in gas phase in the working medium may be liquefied to be in liquid phase. Then, the working medium may pass by the heating rods 40, and the heating rods may be configured to heat the working medium to vaporize a part in liquid phase in the working medium to be in a gas phase, and the working medium may pass by the annular throttling component 30 again and the pressure and temperature of the working medium may be decreased but there is no liquefaction happened. At this time, the working medium may be totally a working medium in a gas state, which may be discharged through the first gap 101 between the annular throttling component 30 and the rotary shaft 20, so that liquid can be prevented from entering the first gap 101 of a hydrostatic gas bearing, which would otherwise lead to unstable operation of the hydrostatic gas bearing.

Furthermore, in this embodiment, the annular throttling component 30 is configured to reduce the pressure and temperature of the high-temperature and high-pressure working medium entering the bearing seat 10, so that the pressure of the working medium meets a design requirement of the hydrostatic gas bearing. The heating temperature of the heating rods 40 may be adjusted to ensure that the part in liquid phase in the working medium is completely vaporized into gas, so that liquid can be prevented from entering the first gap 101

The hydrostatic gas bearing with humidity removed by electrical heating provided in the embodiments of the present disclosure may decrease the temperature and pressure of the medium utilizing a throttling effect with the annular throttling component and the plurality of heating rods, and vaporize a part in liquid phase in the working medium to be in gas phase by the heating rods, so that liquid can be prevented from entering the first gap during operation of a hydrostatic gas bearing, which would otherwise lead to unstable operation of the hydrostatic gas bearing, and the operation reliability of the hydrostatic gas bearing may be improved.

As shown in FIG. 1, in the embodiment of the present disclosure, annular throttling component 30 is made of a porous material, specifically a relatively loose material with micro pores. When the working medium passes through the micro pores, the micro pores may perform throttling effect on the working medium to decrease the pressure and temperature of the working medium. During such process, part in gas phase in the working medium may be liquefied. Optionally, the porous material may be porous ceramics, carbon materials, etc.

Optionally, in another embodiment of the present disclosure, the annular throttling component 30 may be provided with a plurality of first via holes on the wall thereof. Specifically, in the present embodiment, the annular throttling component 30 may also be an annular component with many micro via holes on its wall. These micro via holes may increase the flow resistance on the working medium, so that a throttling effect may be achieved to reduce the temperature and pressure of the working medium.

Furthermore, in the embodiment of the present disclosure, the annular throttling component 30 is preferably a non-metallic annular throttling component. Non-metallic throttling elements have poor thermal conductivity, and when the heating rods 40 conduct heating, the annular throttling component 30 may effectively perform cooling and reduce pressure due to their poor thermal conductivity.

As shown in FIG. 1, in the embodiment of the present disclosure, a plurality of heating rods 40 are arranged circularly along circumference of the annular throttling component 30. to form heating layers, and the heating layers may be in plural with gaps between adjacent layers.

More particularly, a plurality of heating layers may be provided inside the annular throttling component 30, with gaps between adjacent heating layers, so as to form a structure in which throttling layers and heating layers stacked alternatively. Each throttling layer may be configured to reduce the temperature and pressure of the working medium, and each heating layer may be configured to heat the cooled working medium to vaporize the part in liquid phase into gas, and the working medium can become a working medium totally in gas after passing through each heating layer. In the present embodiment, a plurality of throttling layers may reduce the pressure of the working medium to meet design requirements of the hydrostatic gas bearing, and a plurality of heating layers may ensure that the working medium entered into the first gap 101 is a working medium totally in gas, and stable operation of the hydrostatic gas bearing can be ensured.

Furthermore, in the embodiment of the present disclosure, the number, material, and size of the heating rods 40 in each heating layer may be configured according to the specific parameters of the hydrostatic gas bearing.

In the hydrostatic gas bearing with humidity removed by electrical heating provided by the embodiment of the present disclosure, a plurality of heating layers are provided inside the annular throttling component, and a structure in which a plurality of throttling layers and a plurality of heating layers are stacked alternatively is formed in the annular throttling component, so that the working medium undergoes cooling and pressure reduction for multi-times during flowing, and a normal pressure of the hydrostatic gas bearing may be ensured without the impact on the lifespan of the hydrostatic gas bearing from excessively high temperatures of local parts of the hydrostatic gas bearing. All parts in liquid phase in the working medium may be vaporized to be in a gas phase after the working medium passes through each heating layer, so that the working medium are totally in gas phase, and thus liquid is prevented from entering the first gap of the hydrostatic gas bearing. The operation reliability of the hydrostatic gas bearing may be ensured.

As shown in FIG. 1, in the embodiment of the present disclosure, the hydrostatic gas bearing with humidity removed by electrical heating further includes a first adjustable resistor 50, which is electrically connected to a plurality of heating rods 40 and is configured to adjust power of the heating rods 40.

Specifically, a plurality of heating rods 40 are connected in parallel and then connected in series with the first adjustable resistor 50. By adjusting the resistance of the first adjustable resistor 50, the heating power of each heating rod 40 may be adjusted, so that the part in liquid phase in the working medium can be completely vaporized when the working medium passes by the heating rods 40.

Figure 2:
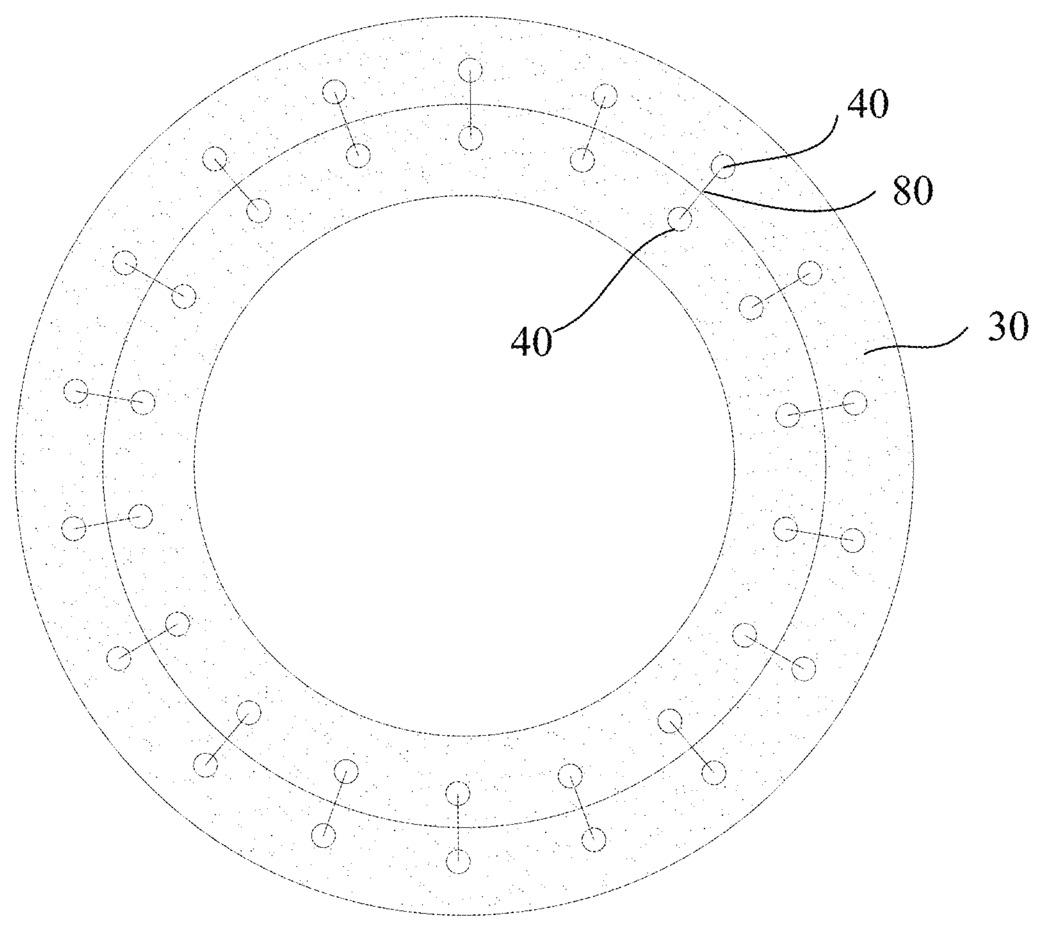
FIG. 2 is a side view of the heating rod shown in FIG. 1.

Furthermore, as shown in FIG. 2, when there are two heating layers, the two ends of two heating rods 40 positioned opposite each other in two heating layers are connected via wires 80 respectively, and then connected to the first adjustable resistor 50 to form a circuit, with a power supply 60 provided in this circuit. In this embodiment, even if there are two heating layers, the heating power of the heating rods 40 in each heating layer is equal to each other, since the heating rods 40 in each heating layer are electrically connected to the first adjustable resistor 50.

Furthermore, when there are a plurality of heating layers, the hydrostatic gas bearing with humidity removed by electrical heating further includes: a second adjustable resistor and a third adjustable resistor. The second adjustable resistor is electrically connected to the heating layer adjacent to the first gap 101, and the third adjustable resistor is electrically connected to the remaining heating layers.

Specifically, with the embodiment shown in FIG. 1 as an example, in FIG. 1, there are two heating layers. In the flow direction of the working medium, after passing through the second heating layer, the working medium will pass through another throttling layer, and its temperature will be further decreased. Therefore, in this embodiment, two adjustable resistors are provided, one of which may be electrically connected to the first heating layer to adjust its heating power, and the other may be electrically connected to the second heating layer to adjust its heating power. The heating power of the second heating layer may be greater than that of the first heating layer to ensure that the working medium remains totally in gas phase after passing through the last throttling layer with temperature being lower.

As shown in FIG. 1, in the embodiment of the present disclosure, a second gap 102 may be formed between the annular throttling component 30 and an inner wall of the bearing seat 10. The second gap 102 may act as an inlet channel, which communicates with the inlet pipe 70.

More particularly, as shown in FIG. 1, in the embodiment of the present disclosure, the bearing seat 10 includes: an annular member 11 and a pair of end caps 12. The pair of end caps 12 are respectively provided at both ends of the annular member 11. Each end cap 12 is provided with a second via hole, through which the rotary shaft 20 passes. A diameter of the second via hole is larger than that of the rotary shaft 20, so that the exhaust channel is provided therein.

More particularly, the pair of end caps 12 are respectively provided at both ends of the annular member 11, so that a cavity may be provided inside the bearing seat 10. The annular throttling component 30 is provided in the cavity. A second gap 102 is formed between the annular throttling component 30 and the annular member 11 to act as an inlet channel. A diameter of a center hole in the annular throttling component 30 is equal to than that of the second via hole of the end cap 12, so that a discharge via hole may be formed through the bearing seat 10. The wire 80 is connected with a power supply 60 provided outside after passing through the end caps 12.

The self-dehumidifying hydrostatic gas bearing provided by the embodiment of the present disclosure has a compact structure, with the original structure of the bearing fully used, generate eddy current in the metal meshes provided between the multiple layers of annular throttling elements with a principle of electromagnetic induction when the rotary shaft rotates so that a part in liquid phase of the working medium may be heated and automatic dehumidification during operation is achieved without additional heating equipment, and the manufacturing cost of the hydrostatic gas bearing is decreased. On the other hand, the self-dehumidifying hydrostatic gas bearing provided by the embodiment of the present disclosure has a good dehumidification effect, with a relatively low maximum temperature of the working medium. The throttling and heating process of the working medium is divided into multiple stages, and the working medium may be cooled through the annular throttling element and then heated through the dense metal mesh in each stage. The overall heating area is large and the heating may be performed evenly, so that the part in liquid phase of the working medium may be removed effectively. Moreover, in the entire process, the working medium undergoes multiple stages of cooling and heating, so that the impact on the service life of the bearing due to excessively high temperatures of local parts of the bearing may be avoided.

The hydrostatic gas bearing with humidity removed by electrical heating provided by the embodiment of the present disclosure has a simple structure for dehumidifying, in which heating rods provided with the original structure of the bearing fully used. The dehumidifying may be conducted automatically as long as the power supply outside and the adjustable resistors are connected. On the other hand, the hydrostatic gas bearing with humidity removed by electrical heating provided by the embodiment of the present disclosure has a good dehumidification effect, with a relatively low maximum temperature of the working medium. The throttling and heating process of the working medium is divided into a plurality of stages, and the working medium may be cooled through the annular throttling component and then heated through the heating rods in each stage. The overall heating area is large and the heating may be performed evenly, so that the part in liquid phase of the working medium may be removed effectively. Moreover, in the entire process, the working medium undergoes a plurality of stages of cooling and heating, so that the impact on the service life of the bearing due to excessively high temperatures of local parts of the bearing may be avoided.

It should be noted that the above embodiments are only used to illustrate the technical solutions of the present disclosure, and not to limit them. Although the present disclosure has been described in detail with reference to the aforementioned embodiments, one skilled in the art should understand that modification may still be made on the technical solutions as described in the foregoing embodiments, or equivalent replacements may be made for some of the technical features. These modifications or replacements shall not drive the technical solutions corresponding thereto off the spirit and scope of the technical solutions of the embodiments of the present disclosure.

The invention claimed is:

1. A hydrostatic gas bearing with humidity removed by electrical heating, comprising:
- a bearing seat with a cavity provided inside, wherein an inlet pipe is provided on an outer surface of the bearing seat and communicates with the cavity;
  - a rotary shaft passing through the bearing seat;
  - an annular throttling component sleeved outside of the rotary shaft and provided inside the cavity, wherein a first gap is provided between the annular throttling component and the rotary shaft and passes through the bearing seat to form an exhaust channel, and wherein the annular throttling component is configured to throttle and cool a working medium; and
  - a plurality of heating rods provided in the annular throttling component, arranged circularly along a circumference of the annular throttling component, and configured to heat and vaporize a part in liquid phase in a cooled medium.

2. The hydrostatic gas bearing of claim 1, wherein the annular throttling component is made of a material in a porous structure.

3. The hydrostatic gas bearing of claim 1, wherein the annular throttling component is provided with a plurality of first via holes on walls thereof, and wherein the plurality of first via holes are configured to perform throttling and cooling on the working medium.

4. The hydrostatic gas bearing of claim 1, wherein the annular throttling component is a non-metallic annular throttling component.

5. The hydrostatic gas bearing of claim 1, wherein a second gap is formed between the annular throttling component and an inner wall of the bearing seat to form an inlet channel which communicates with the inlet pipe.

6. The hydrostatic gas bearing of claim 1, wherein the bearing seat comprises an annular member and a pair of end caps, the pair of end caps are respectively provided at both ends of the annular member, each of the end caps is provided with a second via hole through which the rotary shaft is disposed, and a diameter of the second via hole is larger than a diameter of the rotary shaft so that the exhaust channel is provided therein.

7. The hydrostatic gas bearing of claim 1, wherein the plurality of heating rods are arranged circularly along the circumference of the annular throttling component to form heating layers, and wherein the heating layers are provided in plural with a gap between adjacent layers.

8. The hydrostatic gas bearing of claim 1, further comprising a first adjustable resistor that is electrically connected to the plurality of heating rods and is configured to adjust a power of the plurality of heating rods.

9. The hydrostatic gas bearing of claim 7, further comprising:
- a second adjustable resistor that is electrically connected to a heating layer adjacent to the first gap; and
- a third adjustable resistor that is electrically connected to remaining heating layers.

10. The hydrostatic gas bearing of claim 8, wherein both ends of each of the plurality of heating rods are connected via wires and then connected to the first adjustable resistor.

* * * * *